(12) United States Patent
Liu et al.

(10) Patent No.: US 9,780,637 B2
(45) Date of Patent: Oct. 3, 2017

(54) BUCK CONVERTER WITH CHANGEABLE RELATIONSHIP BETWEEN OUTPUT VOLTAGE AND DUTY CYCLE, AND BUCK CONVERTING APPARATUS USING THE SAME

(71) Applicant: LITE-ON TECHNOLOGY CORP., Taipei (TW)

(72) Inventors: Yu-Chen Liu, Taipei (TW); Jing-Yuan Lin, Taipei (TW); Huang-Jen Chiu, Taipei (TW); Yu-Kang Lo, Taipei (TW); Trong-Nha Quang, Taipei (TW); Po-Jung Tseng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 132 days.

(21) Appl. No.: 14/881,539

(22) Filed: Oct. 13, 2015

(65) Prior Publication Data

US 2016/0373001 A1 Dec. 22, 2016

(30) Foreign Application Priority Data

Jun. 2, 2015 (TW) .............................. 104117806 A

(51) Int. Cl.
*H02M 1/00* (2006.01)
*H02M 3/158* (2006.01)
*H02M 1/08* (2006.01)

(52) U.S. Cl.
CPC ............. *H02M 1/08* (2013.01); *H02M 3/158* (2013.01); *H02M 2001/0048* (2013.01); *H02M 2001/0054* (2013.01); *H02M 2001/0058* (2013.01)

(58) Field of Classification Search
CPC . H02M 2001/0048; H02M 2001/0054; H02M 2001/0058; H02M 2001/0064; H02M 2001/0067; H02M 2001/0074; H02M 2001/0077; H02M 1/08; H02M 1/083; H02M 1/14; H02M 1/146; H02M 1/15; H02M 3/156; H02M 3/158; H02M 2003/1566
See application file for complete search history.

(56) References Cited

U.S. PATENT DOCUMENTS

| | | | |
|---|---|---|---|
| 7,230,405 B2 * | 6/2007 | Jang | H02M 3/1584 323/222 |
| 9,178,420 B1 * | 11/2015 | Hawley | H02M 3/157 |
| 2004/0169499 A1 * | 9/2004 | Huang | H02M 3/1584 323/272 |
| 2009/0128121 A1 * | 5/2009 | Granat | H02M 3/1582 323/355 |

(Continued)

*Primary Examiner* — Jeffrey Gblende
*Assistant Examiner* — David A. Singh
(74) *Attorney, Agent, or Firm* — Rosenberg, Klein & Lee

(57) ABSTRACT

A buck converter includes: a first input terminal; a second input terminal; a first output terminal; a second output terminal; an internal node; a first inductor, a second inductor and a main switch connected in series between the first input terminal and the internal node; a third inductor connected between the internal node and the first output terminal; a fourth inductor connected between the second input terminal and the second output terminal; a first auxiliary switch connected between the internal node and the second output terminal; and a second auxiliary switch connected between the second input terminal and the first output terminal.

22 Claims, 6 Drawing Sheets

(56) References Cited

U.S. PATENT DOCUMENTS

| | | | | |
|---|---|---|---|---|
| 2009/0174376 | A1* | 7/2009 | Barthold | H02M 3/155 323/272 |
| 2010/0237843 | A1* | 9/2010 | Rivet | H02M 1/16 323/282 |
| 2011/0227546 | A1* | 9/2011 | Nishijima | H02M 3/1584 323/271 |
| 2013/0021825 | A1* | 1/2013 | Tamitsuji | H02M 3/155 363/16 |
| 2015/0303855 | A1* | 10/2015 | Verhulst | H02P 23/04 62/611 |
| 2016/0261190 | A1* | 9/2016 | Shenoy | H02M 3/158 |
| 2017/0005563 | A1* | 1/2017 | Ayyanar | H02M 3/1588 |

* cited by examiner

BUCK CONVERTER WITH CHANGEABLE RELATIONSHIP BETWEEN OUTPUT VOLTAGE AND DUTY CYCLE, AND BUCK CONVERTING APPARATUS USING THE SAME

CROSS-REFERENCE TO RELATED APPLICATION

This application claims priority of Taiwanese Application No. 104117806, filed on Jun. 2, 2015.

FIELD

This disclosure relates to buck conversion, and more particularly to a buck converter and a buck converting apparatus using the same.

BACKGROUND

A conventional buck converter receives an input voltage, and converts the input voltage into an output voltage smaller than the input voltage. When the conventional buck converter has a large step-down ratio, a duty cycle of a main switch of the conventional buck converter is relatively small, and thus a root mean square of a current flowing through the main switch is relatively large, making the main switch endure a relatively large maximum current stress and have a relatively large conduction loss.

SUMMARY

Therefore, an object of this disclosure is to provide a buck converter and a buck converting apparatus using the same that can alleviate the drawback of the prior art.

According to one aspect of this disclosure, a buck converter includes a first input terminal, a second input terminal, a first output terminal, a second output terminal, an internal node, a first inductor, a second inductor, a third inductor, a fourth inductor, a main switch, a first auxiliary switch and a second auxiliary switch. The first and second inductors and the main switch are connected in series between the first input terminal and the internal node. The third inductor is connected between the internal node and the first output terminal. The fourth inductor is connected between the second input terminal and the second output terminal. The first auxiliary switch is connected between the internal node and the second output terminal. The second auxiliary switch is connected between the second input terminal and the first output terminal.

According to another aspect of this disclosure, a buck converting apparatus includes a first buck converter and a second buck converter. Each of the first and second buck converters is the buck converter described above. The first and second input terminals of the first buck converter are used to be connected to a voltage source. The first and second output terminals of the first buck converter are used to be connected to a load. The first and second input terminals and the first and second output terminals of the second buck converter are connected respectively to the first and second input terminals and the first and second output terminals of the first buck converter.

According to yet another aspect of this disclosure, a buck converting apparatus includes a first buck converter, a second buck converter, a first control switch and a second control switch. Each of the first and second buck converters is the buck converter described above. The first input terminal of the first buck converter is used to be connected to a voltage source. The first and second output terminals of the first buck converter are used to be connected to a load. The first input terminal and the first and second output terminals of the second buck converter are connected respectively to the first input terminal and the first and second output terminals of the first buck converter. The first control switch has a first terminal that is used to be connected to the voltage source, and a second terminal that is connected to the second input terminal of the first buck converter. The second control switch is connected between the first terminal of the first control switch and the second input terminal of the second buck converter.

BRIEF DESCRIPTION OF THE DRAWINGS

Other features and advantages of this disclosure will become apparent in the following detailed description of the embodiment(s) with reference to the accompanying drawings, of which.

DETAILED DESCRIPTION

Figure 1:
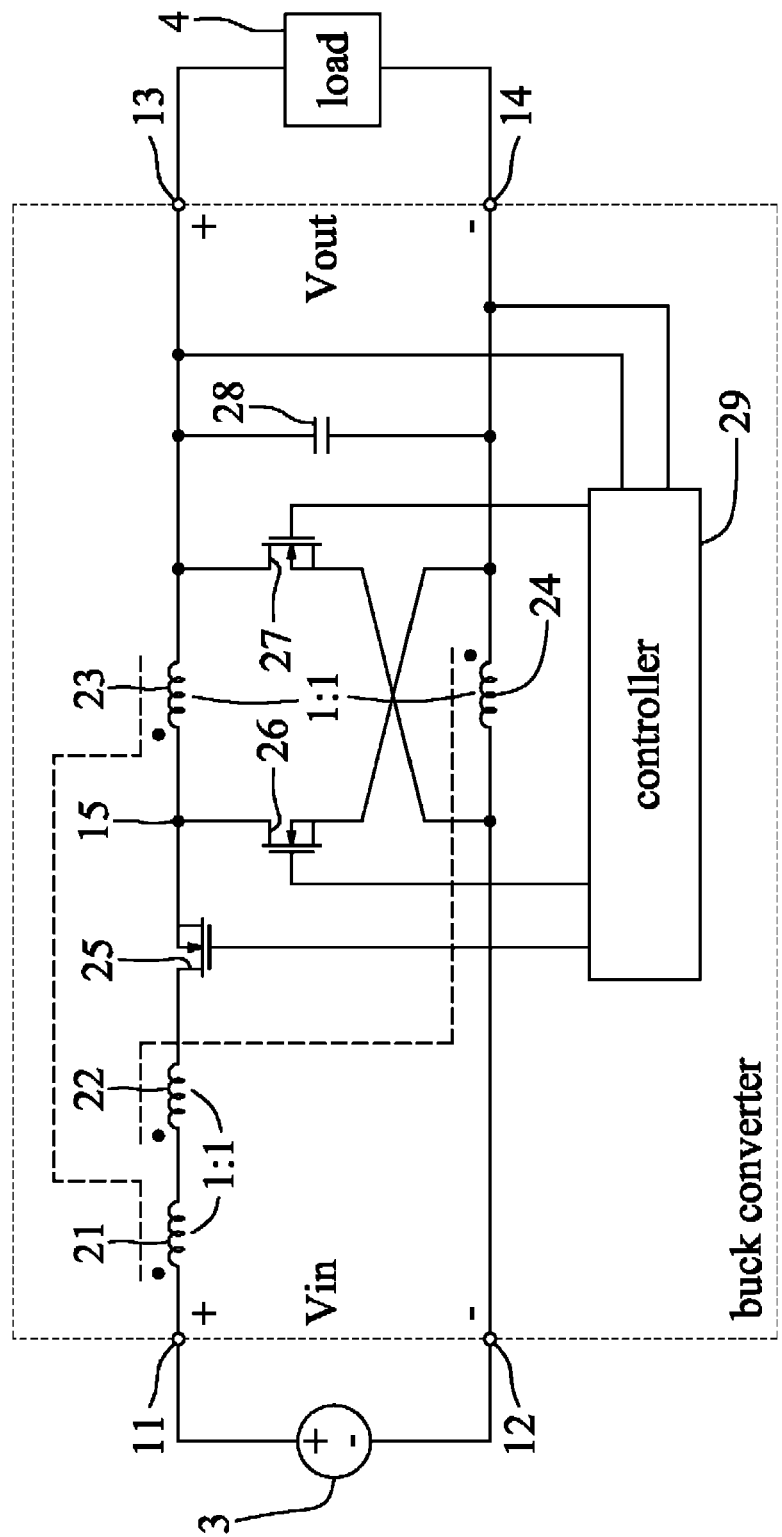
FIG. 1 is a circuit block diagram illustrating an embodiment of a buck converter according to this disclosure.

Before this disclosure is described in greater detail, it should be noted that like elements are denoted by the same reference numerals throughout this disclosure.

Figure 6:
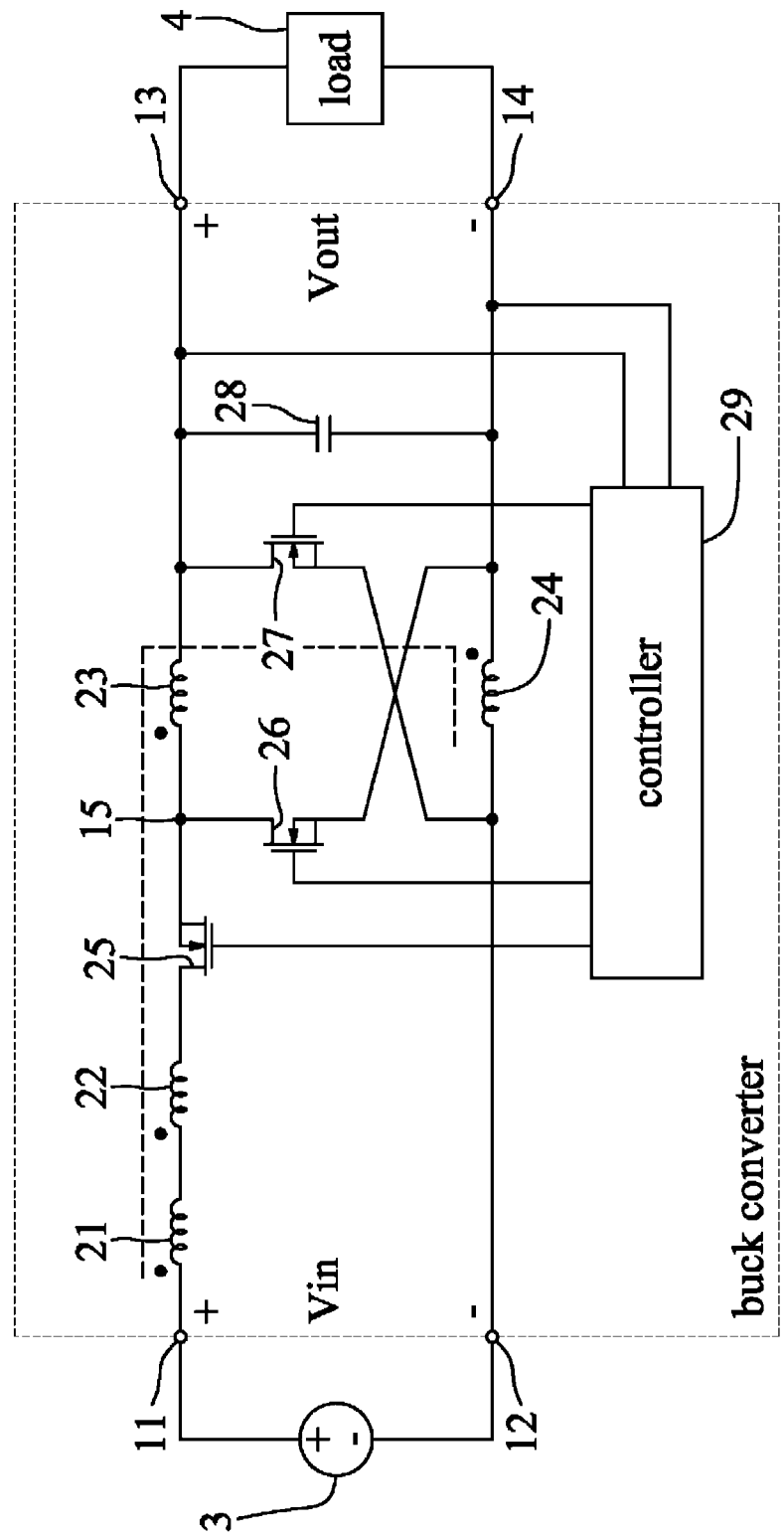
FIG. 6 is a circuit block diagram illustrating a modification of the embodiment of FIG. 1.

Referring to FIGS. 1 and 6, an embodiment of a buck converter according to this disclosure includes a first input terminal 11, a second input terminal 12, a first output terminal 13, a second output terminal 14, an internal node 15, a first inductor 21, a second inductor 22, a third inductor 23, a fourth inductor 24, a main switch 25, a first auxiliary switch 26, a second auxiliary switch 27, a capacitor 28 and a controller 29. The buck converter of this embodiment is used to receive an input voltage (Vin) at the first and second input terminals 11, 12 from a voltage source 3, converts the input voltage (Vin) into an output voltage (Vout) smaller than the input voltage (Vin), and is used to output the output voltage (Vout) at the first and second output terminals 13, 14 to a load 4.

The first and second inductors 21, 22 and the main switch 25 are connected in series between the first input terminal 11 and the internal node 15. In this embodiment, the first inductor 21 has a first terminal connected to the first input terminal 11, and a second terminal; the second inductor 22 has a first terminal connected to the second terminal of the first inductor 21, and a second terminal, and has a number of turns equal to that of the first inductor 21; and the main switch 25 is connected between the second terminal of the second inductor 22 and the internal node 15, and is an N-type metal oxide semiconductor field effect transistor (nMOSFET).

The third inductor 23 is connected between the internal node 15 and the first output terminal 13. In this embodiment, the third inductor 23 has a first terminal connected to the internal node 15, and a second terminal connected to the first output terminal 13, and is magnetically coupled to the first inductor 21; and the first terminals of the first and third inductors 21, 23 have the same voltage polarity.

The fourth inductor 24 is connected between the second input terminal 12 and the second output terminal 14. In this embodiment, the fourth inductor 24 has a first terminal connected to the second output terminal 14, and a second terminal connected to the second input terminal 12, is magnetically coupled to the second inductor 22, and has a number of turns equal to that of the third inductor 23; and the first terminals of the second and fourth inductors 22, 24 have the same voltage polarity.

The first auxiliary switch 26 is connected between the internal node 15 and the second output terminal 14. The second auxiliary switch 27 is connected between the second input terminal 12 and the first output terminal 13. In this embodiment, each of the first and second auxiliary switches 26, 27 is an nMOSFET.

The capacitor 28 is connected between the first and second output terminals 13, 14 for reducing ripples in the output voltage (Vout) outputted at the first and second output terminals 13, 14.

Figure 2:
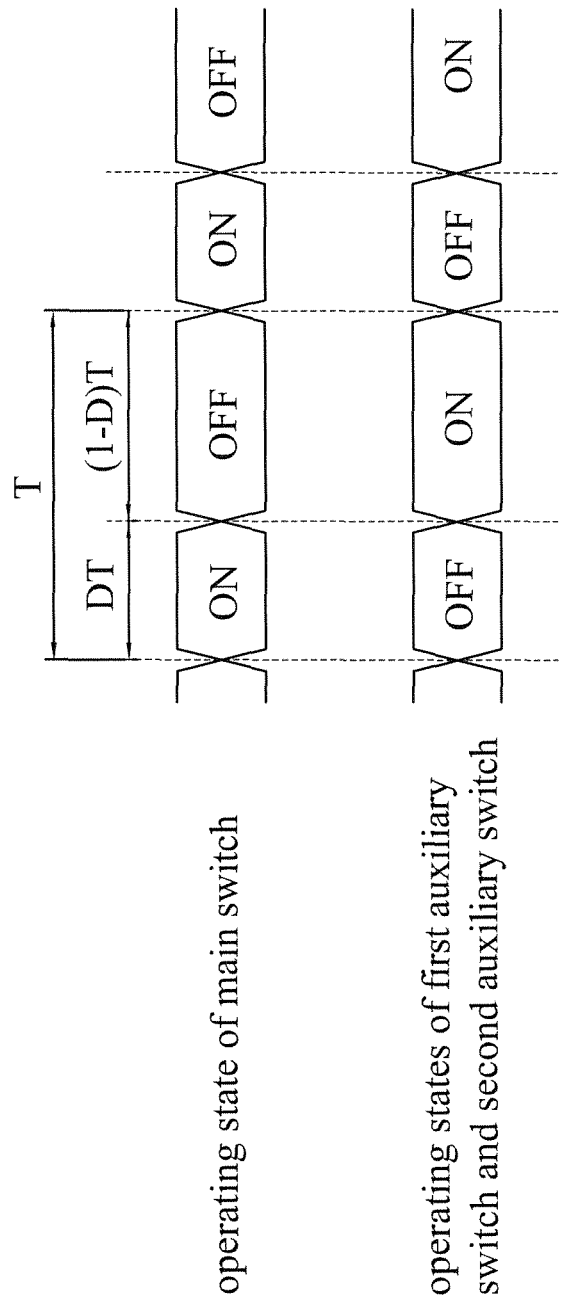
FIG. 2 is a timing diagram illustrating operation of the embodiment of FIG. 1.

Referring to FIGS. 1 and 2, the controller 29 is connected to the first and second output terminals 13, 14, the main switch 25 and the first and second auxiliary switches 26, 27, and controls, based on the output voltage (Vout) outputted at the first and second output terminals 13, 14, operation of each of the main switch 25 and the first and second auxiliary switches 26, 27 between an ON state and an OFF state so as to stabilize the output voltage (Vout) at a target value. In this embodiment, under the control of the controller 29, the first and second auxiliary switches 26, 27 both operate in the OFF state when the main switch 25 operates in the ON state, the first and second auxiliary switches 26, 27 both operate in the ON state when the main switch 25 operates in the OFF state, and at least one of a switching period and an ON time of each of the main switch 25 and the first and second auxiliary switches 26, 27 is variable, where the switching period of each of the main switch 25 and the first and second auxiliary switches 26, 27 is T, the ON time of the main switch 25 is DT, the ON time of each of the first and second auxiliary switches 26, 27 is (1−D)T, and D is a duty cycle of the main switch 25.

During each time period where the main switch 25 operates in the ON state while the first and second auxiliary switches 26, 27 both operate in the OFF state (equal to DT in length), a variation (ΔI⁺) of a current flowing through the third inductor 23 can be expressed by the following equation:

$$\Delta I^+ = \frac{Vin - Vout}{La + Lb + Lc + Ld} \times DT; \quad \text{equation 1}$$

and during each time period where the main switch 25 operates in the OFF state while the first and second auxiliary switches 26, 27 both operate in the ON state (equal to (1−D)T in length), a variation (ΔI⁻) of the current flowing through the third inductor 23 can be expressed by the following equation:

$$\Delta I^- = -\frac{Vout}{Lc} \times (1-D)T, \quad \text{Equation 2}$$

where La, Lb, Lc and Ld respectively denote inductances of the first to fourth inductors 21-24. A sum of the variations (ΔI⁺, ΔI⁻) is zero. Therefore, a ratio of the output voltage (Vout) to the input voltage (Vin) can be obtained from Equations 1 and 2, La=Lb and Lc=Ld, and can be expressed by the following equation:

$$\frac{Vout}{Vin} = \frac{DNa}{2(Na + Nc) - D(2Na + Nc)}, \quad \text{Equation 3}$$

where Na denotes the number of turns of each of the first and second inductors 21, 22, Nc denotes the number of turns of each of the third and fourth inductors 23, 24, and Na:Nc=La:Lc. It is known from Equation 3 that when designing the buck converter of this embodiment, for a given input voltage (Vin), one can change a relationship between the output voltage (Vout) and the duty cycle (D) of the main switch 25 by adjusting the numbers of turns of the first to fourth inductors 21-24, such that when the buck converter of this embodiment has a large step-down ratio, the duty cycle (D) of the main switch 25 is sufficiently large, and thus a root mean square of a current flowing through the main switch 25 is sufficiently small.

Figure 3:
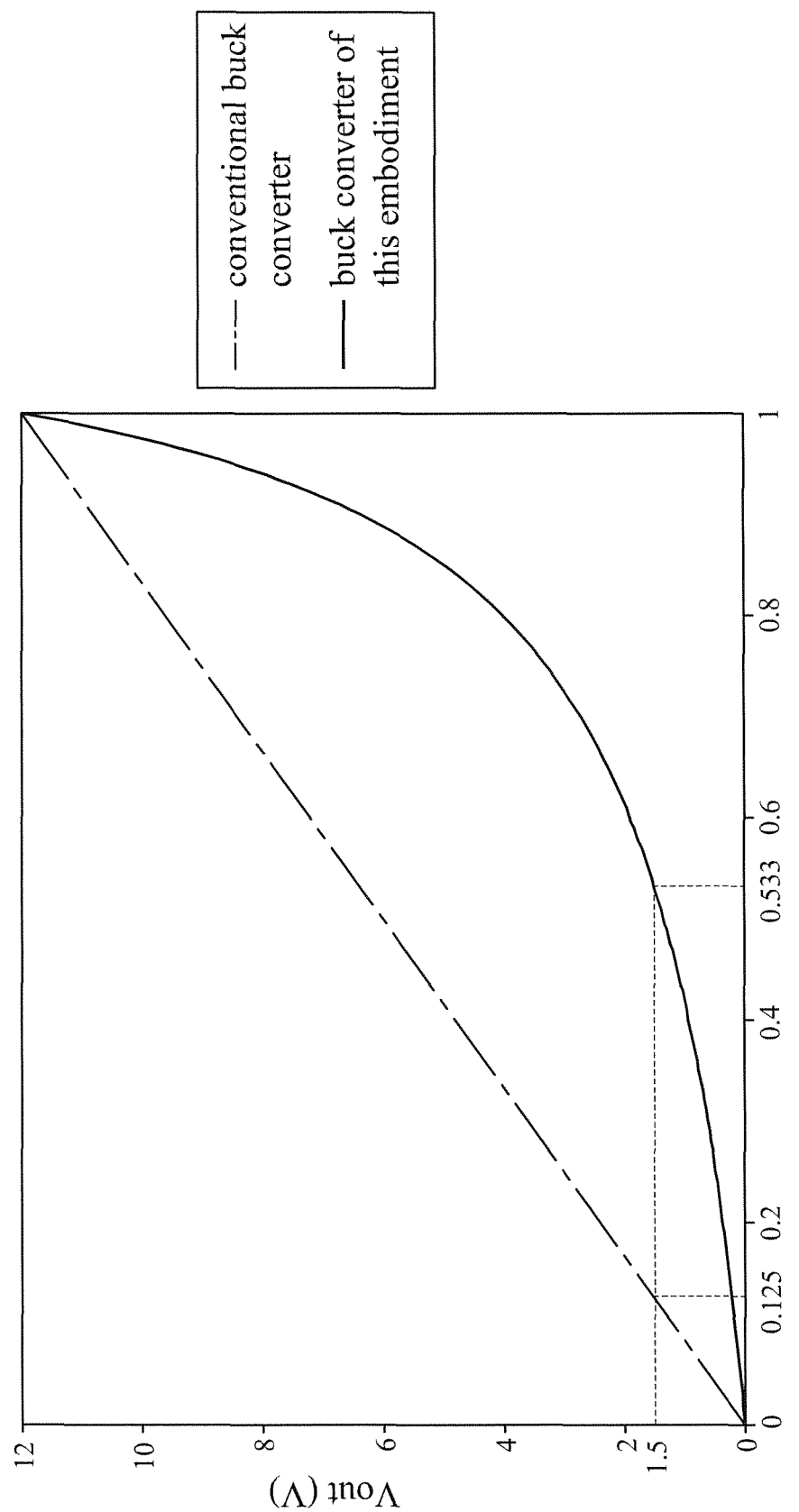
FIG. 3 is a plot illustrating a relationship between an output voltage and a duty cycle of a main switch for each of the embodiment of FIG. 1 and a conventional buck converter.

FIG. 3 illustrates an exemplary relationship between the output voltage (Vout) and the duty cycle (D) of the main switch 25 for the buck converter of this embodiment when the input voltage (Vin) is 12V, and the number of turns of each of the first and second inductors 21, 22 (i.e., Na) is three times the number of turns of each of the third and fourth inductors 23, 24 (i.e., Nc), i.e., Na:Nc=3:1. FIG. 3 also illustrates an exemplary relationship between the output voltage (Vout) and the duty cycle (D) of the main switch 25 for a conventional buck converter, which can be expressed by Vout=D*Vin, when the input voltage (Vin) is 12V. It is known from FIG. 3 that in order to make the output voltage (Vout) equal 1.5V, the duty cycle (D) of the main switch of the conventional buck converter should be 0.125, and the duty cycle (D) of the main switch 25 of the buck converter of this embodiment should be 0.533 which is apparently larger than 0.125. Therefore, compared to the conventional buck converter, when the step-down ratio of the buck converter of this embodiment is large, the duty cycle (D) of the main switch 25 is relatively large, and thus the root mean square of the current flowing through the main switch 25 is relatively small, which results in relatively small maximum current stress and conduction loss.

It is noted that in other embodiments of this disclosure, the following modifications may be made to this embodiment:

1. The first to fourth inductors 21-24 may be magnetically coupled to each other. In this case, the first terminals of the first to fourth inductors 21-24 have the same voltage polarity.

2. The capacitor 28 may be omitted.

3. Each of the first and second auxiliary switch 26, 27 may be a diode. In this case, the connection of the controller 29 to the first and second auxiliary switches 26, 27 and control logic of the controller 29 associated with the first and second auxiliary switches 26, 27 are omitted.

Moreover, under some circumstances, multiple buck converters, each as shown in FIG. 1, may cooperate with each other to convert the input voltage (Vin) from the voltage source 3 into the output voltage (Vout) for the load 4. Details of embodiments in which two buck converters cooperate with each other to convert the input voltage (Vin) into the output voltage (Vout) are described below. Details of other embodiments in which more than two buck converters cooperate with each other to convert the input voltage (Vin) into the output voltage (Vout) can be inferred from the description below, and are omitted for the sake of brevity.

Figure 4:
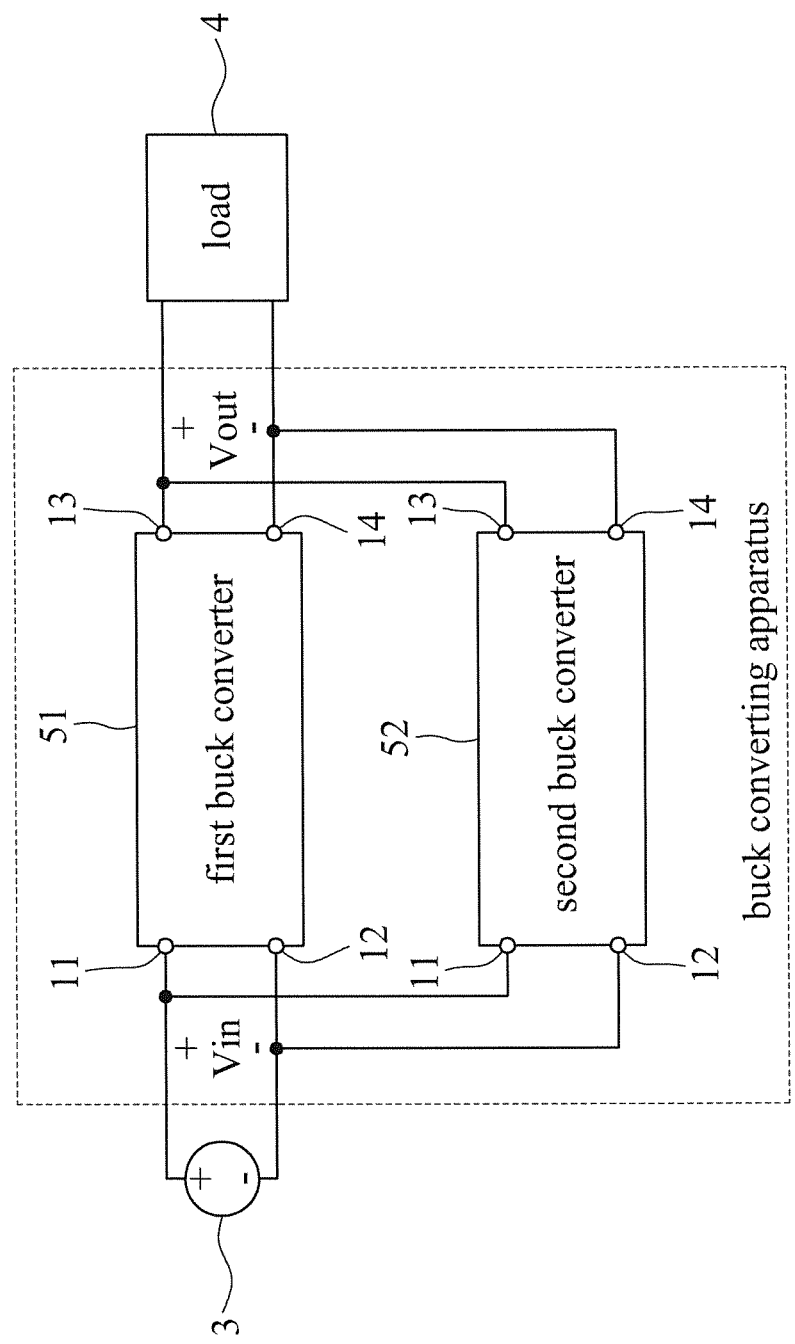
FIG. 4 is a circuit block diagram illustrating a first embodiment of a buck converting apparatus according to this disclosure.

Referring to FIG. 4, a first embodiment of a buck converting apparatus according to this disclosure includes a first buck converter 51 and a second buck converter 52. Each of the first and second buck converters 51, 52 takes the configuration of the buck converter shown in FIG. 1. The first and second input terminals 11, 12 of the first buck converter 51 are used to be connected to the voltage source 3. The first and second output terminals 13, 14 of the first buck converter 51 are used to be connected to the load 4. The first and second input terminals 11, 12 and the first and second output terminals 13, 14 of the second buck converter 52 are connected respectively to the first and second input terminals 11, 12 and the first and second output terminals 13, 14 of the first buck converter 51. The first and second buck converters 51, 52 operate synchronously to convert the input voltage (Vin) from the voltage source 3 into the output voltage (Vout) for the load 4.

Figure 5:
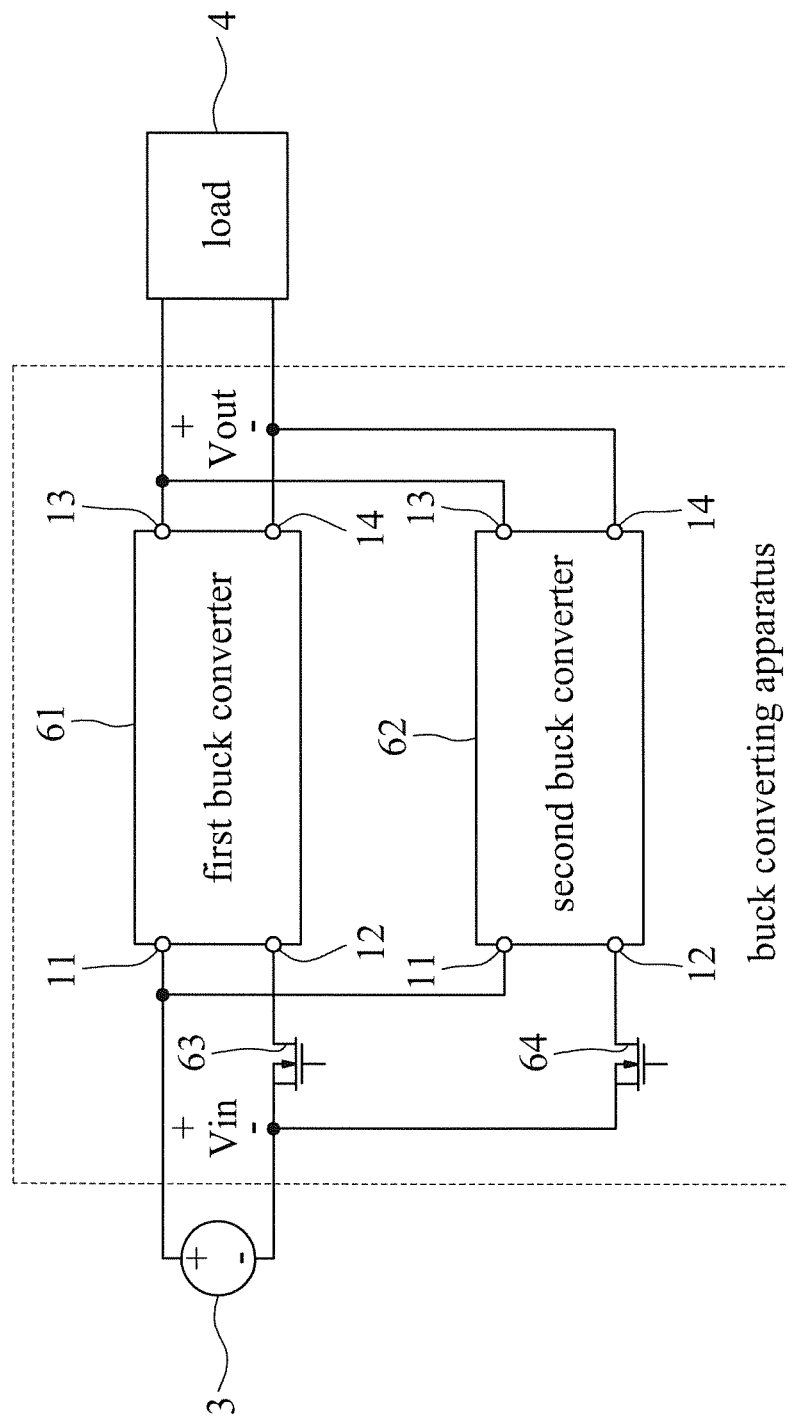
FIG. 5 is a circuit block diagram illustrating a second embodiment of a buck converting apparatus according to this disclosure.

Referring to FIG. 5, a second embodiment of a buck converting apparatus according to this disclosure includes a first buck converter 61, a second buck converter 62, a first control switch 63 and a second control switch 64. Each of the first and second buck converters 61, 62 takes the configuration of the buck converter shown in FIG. 1. The first input terminal 11 of the first buck converter 61 is used to be connected to the voltage source 3. The first and second output terminals 13, 14 of the first buck converter 61 are used to be connected to the load 4. The first input terminal 11 and the first and second output terminals 13, 14 of the second buck converter 62 are connected respectively to the first input terminal 11 and the first and second output terminals 13, 14 of the first buck converter 61. The first control switch 63 (e.g., an nMOSFET) has a first terminal that is used to be connected to the voltage source 3, and a second terminal that is connected to the second input terminal 12 of the first buck converter 61. The second control switch 64 (e.g., an nMOSFET) is connected between the first terminal of the first control switch 63 and the second input terminal 12 of the second buck converter 62. The first and second control switches 63, 64 asynchronously alternate between an ON state and an OFF state. Therefore, the first and second buck converters 61, 62 operate asynchronously to convert the input voltage (Vin) from the voltage source 3 into the output voltage (Vout) for the load 4.

While this disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A buck converter comprising:
   a first input terminal;
   a second input terminal;
   a first output terminal;
   a second output terminal;
   an internal node;
   a first inductor, a second inductor and a main switch that are connected in series between said first input terminal and said internal node;
   a third inductor connected between said internal node and said first output terminal;
   a fourth inductor connected between said second input terminal and said second output terminal, said fourth inductor thereby defining a voltage polarity between said second input and second output terminals;
   a first auxiliary switch connected between said internal node and said second output terminal; and
   a second auxiliary switch connected between said second input terminal and said first output terminal.

2. The buck converter of claim 1, wherein said first and third inductors are magnetically coupled to each other, and said second and fourth inductors are magnetically coupled to each other.

3. The buck converter of claim 1, wherein said first to fourth inductors are magnetically coupled to one another.

4. The buck converter of claim 1, wherein said first and second inductors have the same number of turns, and said third and fourth inductors have the same number of turns.

5. The buck converter of claim 1, further comprising:
   a capacitor connected between said first and second output terminals.

6. The buck converter of claim 1, further comprising:
   a controller connected to said main switch and said first and second auxiliary switches, and controlling operation of each of said main switch and said first and second auxiliary switches between an ON state and an OFF state such that said first and second auxiliary switches both operate in the OFF state when said main switch operates in the ON state, and such that said first and second auxiliary switches both operate in the ON state when said main switch operates in the OFF state.

7. The buck converter of claim 6, wherein said controller is connected further to said first and second output terminals, and controls, based on an output voltage outputted at said first and second output terminals, operation of each of said main switch and said first and second auxiliary switches between the ON state and the OFF state, at least one of a switching period and an ON time of each of said main switch and said first and second auxiliary switches being variable.

8. A buck converting apparatus comprising:
   a first buck converter and a second buck converter;
   wherein each of said first and second buck converters includes a first input terminal, a second input terminal, a first output terminal, a second output terminal, an internal node, a first inductor, a second inductor, a third inductor, a fourth inductor, a main switch, a first auxiliary switch and a second auxiliary switch, said first and second inductors and said main switch being connected in series between said first input terminal and said internal node, said third inductor being connected between said internal node and said first output terminal, said fourth inductor being connected between said second input terminal and said second output terminal, said fourth inductor thereby defining a voltage polarity between said second input and second output terminals, said first auxiliary switch being connected between said internal node and said second output terminal, said second auxiliary switch being connected between said second input terminal and said first output terminal;

wherein said first and second input terminals of said first buck converter are used to be connected to a voltage source, and said first and second output terminals of said first buck converter are used to be connected to a load; and wherein said first and second input terminals and said first and second output terminals of said second buck converter are connected respectively to said first and second input terminals and said first and second output terminals of said first buck converter.

9. The buck converting apparatus of claim 8, wherein for each of said first and second buck converters, said first and third inductors are magnetically coupled to each other, and said second and fourth inductors are magnetically coupled to each other.

10. The buck converting apparatus of claim 8, wherein for each of said first and second buck converters, said first to fourth inductors are magnetically coupled to one another.

11. The buck converting apparatus of claim 8, wherein for each of said first and second buck converters, said first and second inductors have the same number of turns, and said third and fourth inductors have the same number of turns.

12. The buck converting apparatus of claim 8, wherein each of said first and second buck converters further includes:
a capacitor connected between said first and second output terminals.

13. The buck converting apparatus of claim 8, wherein each of said first and second buck converters further includes:
a controller connected to said main switch and said first and second auxiliary switches, and controlling operation of each of said main switch and said first and second auxiliary switches between an ON state and an OFF state such that said first and second auxiliary switches both operate in the OFF state when said main switch operates in the ON state, and such that said first and second auxiliary switches both operate in the ON state when said main switch operates in the OFF state.

14. The buck converting apparatus of claim 13, wherein for each of said first and second buck converters, said controller is connected further to said first and second output terminals, and controls, based on an output voltage outputted at said first and second output terminals, operation of each of said main switch and said first and second auxiliary switches between the ON state and the OFF state, at least one of a switching period and an ON time of each of said main switch and said first and second auxiliary switches being variable.

15. A buck converting apparatus comprising:
a first buck converter, a second buck converter, a first control switch and a second control switch;
wherein each of said first and second buck converters includes a first input terminal, a second input terminal, a first output terminal, a second output terminal, an internal node, a first inductor, a second inductor, a third inductor, a fourth inductor, a main switch, a first auxiliary switch and a second auxiliary switch, said first and second inductors and said main switch being connected in series between said first input terminal and said internal node, said third inductor being connected between said internal node and said first output terminal, said fourth inductor being connected between said second input terminal and said second output terminal, said fourth inductor thereby defining a voltage polarity between said second input and second output terminals, said first auxiliary switch being connected between said internal node and said second output terminal, said second auxiliary switch being connected between said second input terminal and said first output terminal;

wherein said first input terminal of said first buck converter is used to be connected to a voltage source, and said first and second output terminals of said first buck converter are used to be connected to a load;

wherein said first input terminal and said first and second output terminals of said second buck converter are connected respectively to said first input terminal and said first and second output terminals of said first buck converter;

wherein said first control switch has a first terminal used to be connected to the voltage source, and a second terminal connected to said second input terminal of said first buck converter; and wherein said second control switch is connected between said first terminal of said first control switch and said second input terminal of said second buck converter.

16. The buck converting apparatus of claim 15, wherein for each of said first and second buck converters, said first and third inductors are magnetically coupled to each other, and said second and fourth inductors are magnetically coupled to each other.

17. The buck converting apparatus of claim 15, wherein for each of said first and second buck converters, said first to fourth inductors are magnetically coupled to one another.

18. The buck converting apparatus of claim 15, wherein for each of said first and second buck converters, said first and second inductors have the same number of turns, and said third and fourth inductors have the same number of turns.

19. The buck converting apparatus of claim 15, wherein each of said first and second buck converters further includes:
a capacitor connected between said first and second output terminals.

20. The buck converting apparatus of claim 15, wherein each of said first and second buck converters further includes:
a controller connected to said main switch and said first and second auxiliary switches, and controlling operation of each of said main switch and said first and second auxiliary switches between an ON state and an OFF state such that said first and second auxiliary switches both operate in the OFF state when said main switch operates in the ON state, and such that said first and second auxiliary switches both operate in the ON state when said main switch operates in the OFF state.

21. The buck converting apparatus of claim 20, wherein for each of said first and second buck converters, said controller is connected further to said first and second output terminals, and controls, based on an output voltage outputted at said first and second output terminals, operation of each of said main switch and said first and second auxiliary switches between the ON state and the OFF state, at least one of a switching period and an ON time of each of said main switch and said first and second auxiliary switches being variable.

22. The buck converting apparatus of claim 15, wherein said first and second control switches asynchronously alternate between an ON state and an OFF state.

* * * * *